(12) United States Patent
Vetter (10) Patent No.: US 9,485,849 B1
(45) Date of Patent: Nov. 1, 2016

(54) RF PARTICLE ACCELERATOR STRUCTURE WITH FUNDAMENTAL POWER COUPLERS FOR AMPERE CLASS BEAM CURRENT

(75) Inventor: Arthur M. Vetter, Renton, WA (US)

(73) Assignee: The Boeing Company, Chicago, IL (US)

( * ) Notice: Subject to any disclaimer, the term of this patent is extended or adjusted under 35 U.S.C. 154(b) by 1237 days.

(21) Appl. No.: 13/280,349

(22) Filed: Oct. 25, 2011

(51) Int. Cl.
  *H05H 7/22* (2006.01)
  *H01S 3/09* (2006.01)
  *H05H 7/04* (2006.01)

(52) U.S. Cl.
  CPC .............. *H05H 7/22* (2013.01); *H01S 3/0903* (2013.01); *H05H 7/04* (2013.01); *H05H 2007/041* (2013.01); *H05H 2007/225* (2013.01); *H05H 2007/227* (2013.01)

(58) Field of Classification Search
  CPC .......... H05H 2007/225; H05H 9/044; H05H 2007/025; H05H 2007/227; H05H 7/02; H05H 7/22; H01S 3/0903; H01S 3/0906; H01S 3/09707; H01S 3/0955–3/0959
  USPC ..................................... 372/73, 74; 315/505
  See application file for complete search history.

(56) References Cited

U.S. PATENT DOCUMENTS

| | | | | |
|---|---|---|---|---|
| 5,319,313 | A * | 6/1994 | Vogel et al. ................... | 315/500 |
| 5,578,909 | A * | 11/1996 | Billen ............................ | 315/505 |
| 6,888,326 | B2 * | 5/2005 | Amaldi et al. ................ | 315/505 |
| 7,208,890 | B2 * | 4/2007 | Zavadtsev et al. ........... | 315/500 |
| 7,345,435 | B1 * | 3/2008 | Sekutowicz et al. ......... | 315/500 |
| 7,423,278 | B2 * | 9/2008 | Amaldi et al. ............. | 250/492.3 |
| 2008/0042784 | A1 * | 2/2008 | Lewellen et al. ............. | 333/227 |
| 2010/0060208 | A1 * | 3/2010 | Swenson ....................... | 315/505 |

OTHER PUBLICATIONS

Wlodarczak, "Fundamental Power Coupler Development for Low-Beta Superconducting Cavities," 2009, ProQuest LLC, UMI Microform 1463062, 1-89.*

* cited by examiner

*Primary Examiner* — Joshua King
(74) *Attorney, Agent, or Firm* — McDonnell Boehnen Hulbert & Berghoff LLP (57) ABSTRACT

A radio frequency particle accelerator structure and particle acceleration method are disclosed. Radio frequency electromagnetic energy is emitted from a fundamental power coupler coupled between a first electromagnetic resonant cavity sequentially coupled a second electromagnetic resonant cavity. The radio frequency electromagnetic energy is resonated in the first electromagnetic resonant cavity and the second electromagnetic resonant cavity.

20 Claims, 4 Drawing Sheets

RF PARTICLE ACCELERATOR STRUCTURE WITH FUNDAMENTAL POWER COUPLERS FOR AMPERE CLASS BEAM CURRENT

GOVERNMENT RIGHTS

This invention was made with Government support under N00014-09-D-0354 awarded by Department of Defense. The government has certain rights in this invention.

FIELD

Embodiments of the present disclosure relate generally to particle accelerators. More particularly, embodiments of the present disclosure relate to particle accelerators comprising fundamental power couplers.

BACKGROUND

Superconducting radio frequency accelerator cryomodules based on single cell cavities have been designed, but these designs have not included fundamental power couplers with sufficiently strong coupling to match a cavity for a 1-ampere (A) beam. Furthermore, existing designs have single cell cavities spaced at intervals of over 1.6 free space wavelengths, so that the effective accelerating gradient in such a design would be to less than 1.5 MeV/m even if adequate couplers could be incorporated. Existing designs do not offer simultaneously strong fundamental power coupling, superconducting radio frequency accelerating cavities, and high linear density of accelerating cells along a beam axis.

SUMMARY

A radio frequency particle accelerator structure and particle acceleration method are disclosed. Radio frequency electromagnetic energy is emitted from a fundamental power coupler connected between a first electromagnetic resonant cavity sequentially coupled to a second electromagnetic resonant cavity. The radio frequency electromagnetic energy resonates in the first electromagnetic resonant cavity and the second electromagnetic resonant cavity.

In this manner, embodiments of the disclosure provide a high brightness particle beam that can provide an average current on the order of 1 ampere. Embodiments of the disclosure provide for future high power free electron lasers and other accelerator-driven sources of electromagnetic radiation.

In an embodiment, a radio frequency particle accelerator structure comprises a first electromagnetic resonant cavity, a second electromagnetic resonant cavity, and a fundamental power coupler. The first electromagnetic resonant cavity is operable to drive a particle beam by resonating an electromagnetic mode. The second electromagnetic resonant cavity is sequentially coupled to the first electromagnetic resonant cavity, and is operable to drive the particle beam by resonating an electromagnetic mode. The fundamental power coupler is connected to the first electromagnetic resonant cavity and the second electromagnetic resonant cavity, and is operable to emit a radio frequency electromagnetic energy into the first electromagnetic resonant cavity and the second electromagnetic resonant cavity.

In another embodiment, a particle acceleration method emits radio frequency electromagnetic energy from a fundamental power coupler connected between a first electromagnetic resonant cavity coupled sequentially to a second electromagnetic resonant cavity. The method further resonates the radio frequency electromagnetic energy in the first electromagnetic resonant cavity and the second electromagnetic resonant cavity.

In a further embodiment, a method for providing a radio frequency particle accelerator structure provides a first electromagnetic resonant cavity operable to drive a particle beam by resonating an electromagnetic mode. The method further couples sequentially a second electromagnetic resonant cavity to the first electromagnetic resonant cavity, the second electromagnetic resonant cavity is operable to drive the particle beam by resonating an electromagnetic mode. The method further configures a fundamental power coupler to emit radio frequency electromagnetic energy into the first electromagnetic resonant cavity and the second electromagnetic resonant cavity.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to particle accelerators, laser technology, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, an electron source for a free electron laser. Embodiments of the disclosure, however, are not limited to such free electron laser applications, and the techniques described herein may also be utilized in other applications. For example but without limitation, embodiments may be applicable to fusion energy, particle accelerators, particle beam generators, medical equipment, or other application.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

High brightness particle beams with average current on the order of 1 ampere may be required for future high power free electron lasers and other accelerator-driven sources of electromagnetic radiation. Embodiments of the disclosure provide a configuration of an array of Superconducting Radio Frequency (SRF) accelerator cavities, with fundamental power couplers optimized for continuous wave (CW) acceleration of a particle beam. The fundamental power couplers are located in beam pipes connecting accelerating cells, with a beam pipe length adjusted so that accelerating cell centers are spaced at intervals of one half of a free space wavelength of an accelerator mode for acceleration of relativistic particles.

Figure 1:
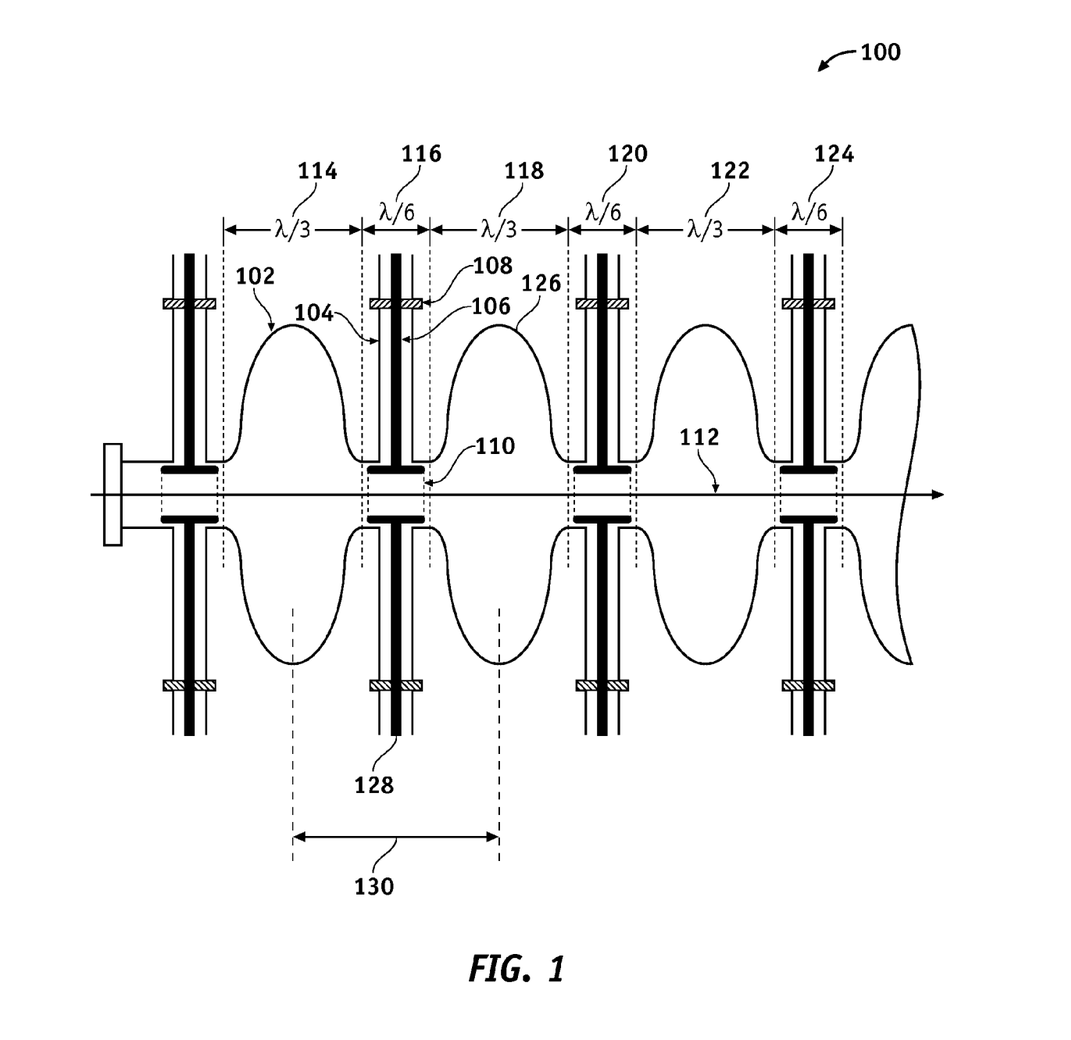
FIG. 1 is an illustration of an exemplary radio frequency particle accelerator structure according to an embodiment of the disclosure.

FIG. 1 is an illustration of an exemplary radio frequency electron accelerator structure 100 (structure 100) according to an embodiment of the disclosure. The structure 100 comprises a first electromagnetic resonant cavity 102, a second electromagnetic resonant cavity 126, and a fundamental power coupler 110.

Figure 2:
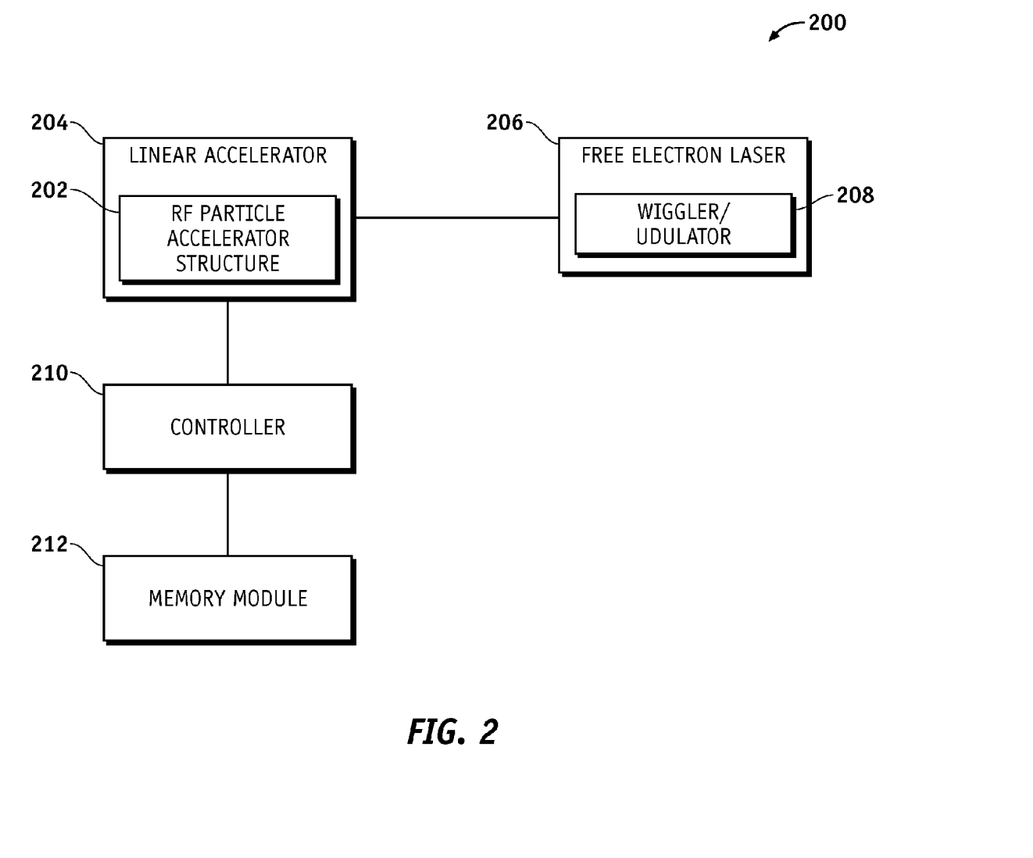
FIG. 2 is an illustration of an exemplary functional block diagram of a radio frequency particle accelerator system according to an embodiment of the disclosure.

The first electromagnetic resonant cavity 102 is operable to drive a particle beam 112 by resonating an electromagnetic mode of electromagnetic energy contained in the first electromagnetic resonant cavity 102. The particle beam 112 may comprise, for example but without limitation, an electron beam, a proton beam, or other particle beam. The particle beam 112 may be fed to a wiggler/undulator 208 (FIG. 2) of a linear accelerator 204 (FIG. 2). The first electromagnetic resonant cavity 102 may have a length 114 of, for example but without limitation, $\lambda/3$ where $\lambda$ equals an axial velocity of particles of the particle beam 112 divided by a frequency of radio frequency electromagnetic energy resonating in the first electromagnetic resonant cavity 102 and the second electromagnetic resonant cavity 126. The first electromagnetic resonant cavity 102 and the second electromagnetic resonant cavity 126 are spaced at an interval 130 of $\mu/2$.

The second electromagnetic resonant cavity 126 is sequentially coupled to the first electromagnetic resonant cavity 102, and is also operable to drive the particle beam 112 by resonating an electromagnetic mode. The second electromagnetic resonant cavity 126 may have a length 118 of, for example but without limitation, $\lambda/3$ where $\lambda$ equals an axial velocity of particles of the particle beam 112 divided by a frequency of radio frequency electromagnetic energy resonating in the first electromagnetic resonant cavity 102 and the second electromagnetic resonant cavity 126. Additional resonant cavities may also have a length 122 of, for example but without limitation, $\lambda/3$ where $\lambda$ equals an axial velocity of particles of the particle beam 112 divided by a frequency of radio frequency electromagnetic energy resonating in the first electromagnetic resonant cavity 102 and the second electromagnetic resonant cavity 126.

The fundamental power coupler 110 is connected to the first electromagnetic resonant cavity 102 and the second electromagnetic resonant cavity 126. The fundamental power coupler 110 is operable to emit a radio frequency electromagnetic energy into the first electromagnetic resonant cavity 102 and the second electromagnetic resonant cavity 126. A first coaxial transmission line 106 may be connected to the fundamental power coupler 110 to deliver the radio frequency electromagnetic energy to the fundamental power coupler 110. The first coaxial transmission line 106 may be used to provide structural support to the fundamental power coupler 110. A second coaxial transmission line 128 may be connected to the fundamental power coupler 110 to deliver additional radio frequency electromagnetic energy to the fundamental power coupler 110. The second coaxial transmission line 128 may also be used to provide additional structural support to the fundamental power coupler 110.

A dielectric window 108 transmissive at radio frequency may be used to seal a substantial vacuum of the first electromagnetic resonant cavity 102 and the second electromagnetic resonant cavity 126, while insulating the first coaxial transmission line 106. By using the fundamental power coupler 110 to power both the first electromagnetic resonant cavity 102 and the second electromagnetic resonant cavity 126, a distance 116 (and 120/124) between the first electromagnetic resonant cavity 102 and the second electromagnetic resonant cavity 126 may be reduced to a length of, for example but without limitation, $\lambda/6$ where $\lambda$ equals an axial velocity of particles of the particle beam 112 divided by a frequency of radio frequency electromagnetic energy resonating in the first electromagnetic resonant cavity 102 and the second electromagnetic resonant cavity 126.

FIG. 2 is an illustration of an exemplary functional block diagram of a radio frequency electron accelerator system 200 (system 200) according to an embodiment of the disclosure. A practical embodiment of the system 200 may comprise any number of controllers, any number of memory modules, and any number of other modules. The illustrated system 200 depicts a simple embodiment for ease of description. These and other elements of the system 200 are interconnected together, allowing communication between the various elements of system 200. In one embodiment, these and other elements of the system 200 may be interconnected together via coupling structures. Those of skill in the art will understand that the various illustrative blocks, modules, circuits, and processing logic described in connection with the embodiments disclosed herein may be implemented in hardware, computer-readable software, firmware, or any practical combination thereof.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure. The system 200 may comprise the linear accelerator 204, a free electron laser 206, a controller 210, and a memory module 212.

The linear accelerator 204 comprises a radio frequency particle accelerator structure 202 corresponding to the structure 100. The free electron laser 206 receives accelerated electrons from the radio frequency particle accelerator structure 202 of the linear accelerator 204. The free electron laser 206 can achieve very high peak powers, and a tunability of the free electron laser 206 provides highly desirable properties useful in disciplines such as, for example but without limitation, medical diagnosis, non-destructive testing, and or other similar disciplines. The radio frequency particle accelerator structure 202 can generally accelerate the particle beam 112 to velocities approaching a speed of light.

The free electron laser 206 comprises a laser that emits a beam comprising coherent electromagnetic radiation, which in some embodiments can reach high power. Rather than exciting electrons bound in atomic or molecular states as is done in gas, liquid, and solid-state lasers, the free electron laser 206 uses the particle beam 112 as a lasing medium. The particle beam 112 moves freely through a magnetic structure, which motivates the term "free electron laser". The free electron laser 206 has a wide frequency range that may be widely tunable, ranging in wavelength from, for example but without limitation, microwaves, terahertz radiation, infrared, visible spectrum, ultraviolet, X-rays, or other wavelength.

The free electron laser 206 comprises the wiggler/undulator 208. The wiggler/undulator 208 comprises an arrangement of magnets (not shown) with alternating poles within a laser cavity (not shown) along a path of the particle beam 112. The particle beam 112 passes through a periodic transverse magnetic field produced by the wiggler/undulator 208. This wiggler/undulator 208 generally forces electrons in the particle beam 112 to follow a sinusoidal path. Acceleration of electrons along the sinusoidal path results in release of photons (synchrotron radiation). A portion of electrons in the particle beam 112 are generally in phase with a field of light already emitted, and add together coherently. A wavelength of emitted light can be readily tuned by adjusting an energy of the particle beam 112 or a magnetic field strength of the wiggler/undulator 208.

Applications for the free electron laser 206 may comprise, for example but without limitation, an X-ray laser, a femtosecond laser, a medical laser, a laser weapon, or other application. Free electron laser technology is being evaluated as a candidate for an anti-aircraft and anti-missile directed-energy weapon. Significant progress is being made in raising free electron laser power levels and building a compact multi-megawatt class free electron laser weapon should be possible. A free electron laser may use a ship's electrical power to create, in effect, substantially unlimited ammunition and provide ultra-precise, speed-of-light capability to defend naval forces against emerging threats, such as hyper-velocity cruise missiles.

The controller 210 comprises processing logic that is configured to carry out the functions, techniques, and processing tasks associated with the operation of the system 200. In particular, the processing logic is configured to support the system 200 described herein. The controller 210 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 212 may comprise a data storage area with memory formatted to support the operation of the system 200. The memory module 212 may comprise a non-volatile memory operable to store operational data for the system 200. The operational data may comprise value of the radio frequency electromagnetic energy, temperature, time, or other data.

In practical embodiments, the memory module 212 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 212 may be coupled to the controller 210 and configured to store, for example but without limitation, a database comprising the operational data mentioned above, a computer program that is executed by the controller 210, an operating system, an application program, tentative data used in executing a program, or other application. Additionally, the memory module 212 may represent a dynamically updating database containing a table for updating the database.

The memory module 212 may be coupled to the controller 210 such that the controller 210 can read information from and write information to the memory module 212. For example, as mentioned above, the controller 210 may access the memory module 212 to access the operational data for the system 200.

As an example, the controller 210 and memory module 212 may reside in respective application specific integrated circuits (ASICs). The memory module 212 may also be integrated into the controller 210. In an embodiment, the memory module 212 may comprise a cache memory for storing temporary variables or other intermediate information during execution of instructions to be executed by the controller 210.

Figure 3:
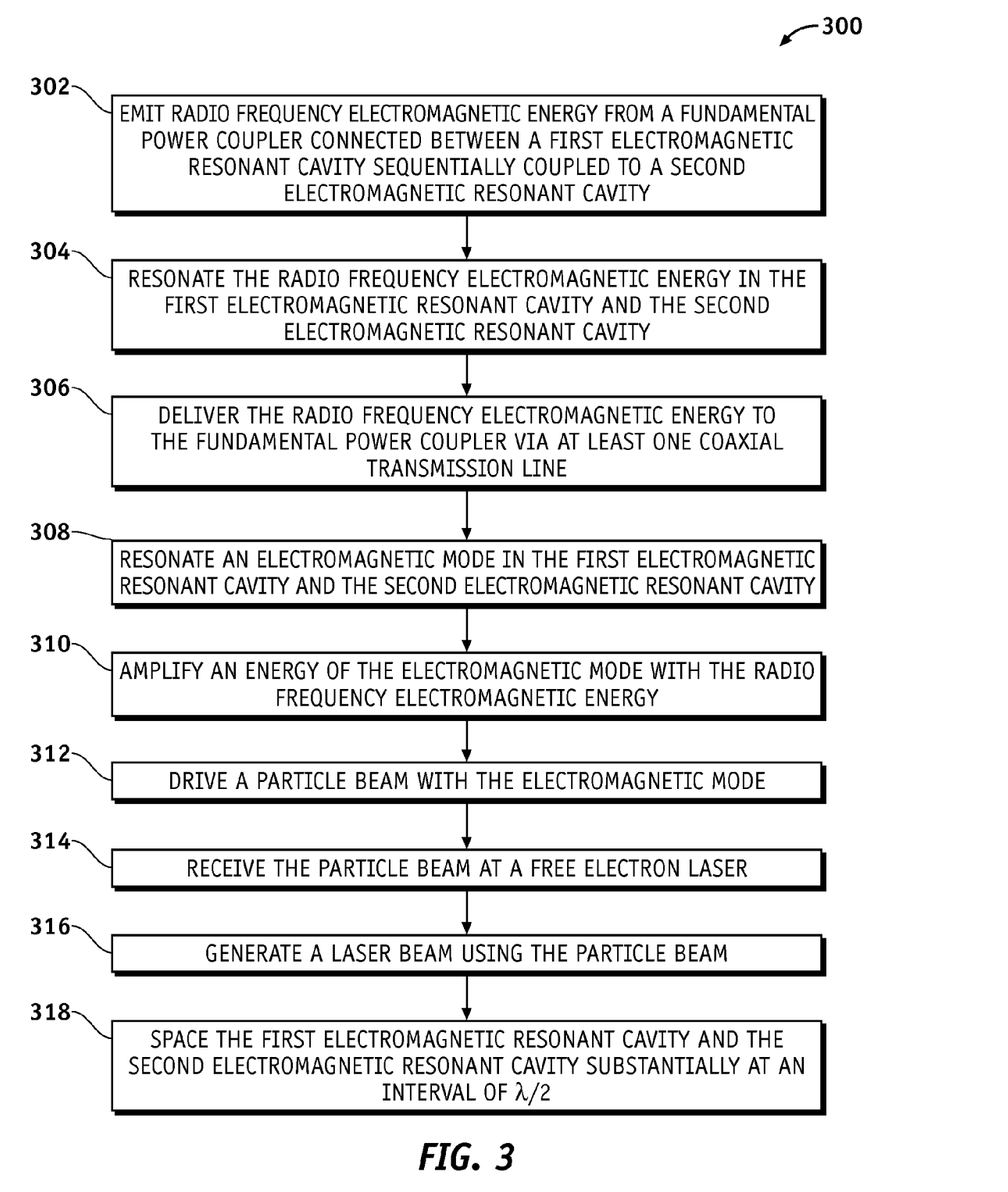
FIG. 3 is an illustration of an exemplary flowchart showing an particle acceleration process according to an embodiment of the disclosure.

FIG. 3 is an illustration of an exemplary flowchart showing an electron acceleration process 300 according to an embodiment of the disclosure. The various tasks performed in connection with process 300 may be performed mechanically, by software, hardware, firmware, a computer-readable medium having computer executable instructions for performing the processes methods, or any combination thereof. For illustrative purposes, the following description of the process 300 may refer to elements mentioned above in connection with FIG. 1.

It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. In practical embodiments, portions of the process 300 may be performed by different elements of the structure 100 and system 200 such as: the first electromagnetic resonant cavity 102, the second electromagnetic resonant cavity 126, and the fundamental power coupler 110, etc. Process 300 may have functions, material, and structures that are similar to the embodiments shown in FIGS. 1-2. Therefore, common features, functions, and elements may not be redundantly described here.

Process 300 may begin by emitting a radio frequency electromagnetic energy from a fundamental power coupler such as the fundamental power coupler 110 connected between a first electromagnetic resonant cavity such as the first electromagnetic resonant cavity 102 sequentially coupled to a second electromagnetic resonant cavity such as the second electromagnetic resonant cavity 126 (task 302).

Process 300 may continue by resonating the radio frequency electromagnetic energy in the first electromagnetic resonant cavity 102 and the second electromagnetic resonant cavity 126 (task 304).

Process 300 may continue delivering the radio frequency electromagnetic energy to the fundamental power coupler 110 via at least one coaxial transmission line such as the first coaxial transmission line 106 (task 306).

Process 300 may continue by resonating an electromagnetic mode in the first electromagnetic resonant cavity 102 and the second electromagnetic resonant cavity 126 (task 308).

Process 300 may continue by amplifying an energy of the electromagnetic mode via the radio frequency electromagnetic energy (task 310).

Process 300 may continue by driving a particle beam such as the particle beam 112 via the electromagnetic mode (task 312).

Process 300 may continue by receiving the particle beam 112 at a free electron laser such as the free electron laser 206 (task 314).

Process 300 may continue by generating a laser beam using the particle beam 112 (task 316).

Process 300 may continue by spacing the first electromagnetic resonant cavity 102 and the second electromagnetic resonant cavity 126 substantially at an interval of $\lambda/2$ such as the interval 130 (task 318). As explained above, $\lambda$ is equal to an axial velocity of the particle beam divided by a frequency of the radio frequency electromagnetic energy.

Figure 4:
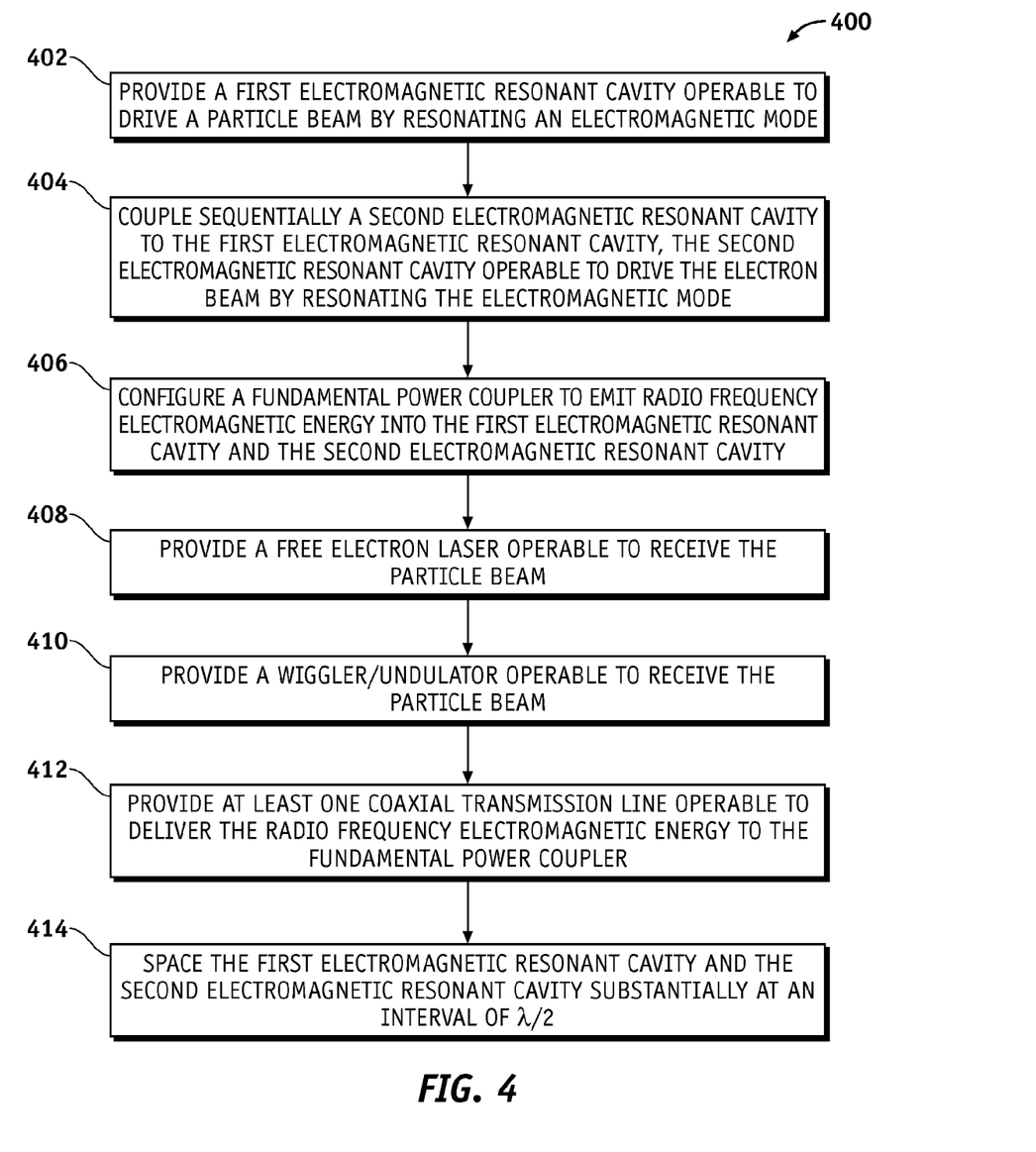
FIG. 4 is an illustration of an exemplary flowchart showing a process for providing a radio frequency particle accelerator structure according to an embodiment of the disclosure.

FIG. 4 is an illustration of an exemplary flowchart showing a process 400 for providing a radio frequency electron accelerator structure according to an embodiment of the disclosure. The various tasks performed in connection with the process 400 may be performed mechanically, by software, hardware, firmware, a computer-readable medium having computer executable instructions for performing the processes methods, or any combination thereof. For illustrative purposes, the following description of the process 400 may refer to elements mentioned above in connection with FIG. 1.

It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein. In practical embodiments, portions of the process 400 may be performed by different elements of the structure 100 and system 200 such as: the first electromagnetic resonant cavity 102, the second electromagnetic resonant cavity 126, and the fundamental power coupler 110, etc. Process 400 may have functions, material, and structures that are similar to the embodiments shown in FIGS. 1-2. Therefore, common features, functions, and elements may not be redundantly described here.

Process 400 may begin by providing a first electromagnetic resonant cavity such as the first electromagnetic resonant cavity 102 operable to drive a particle beam such as the particle beam 112 by resonating an electromagnetic mode (task 402).

Process 400 may continue by coupling sequentially a second electromagnetic resonant cavity such as the second electromagnetic resonant cavity 126 to the first electromagnetic resonant cavity 102 (task 404). The second electromagnetic resonant cavity 126 is operable to drive the particle beam 112 by resonating the electromagnetic mode.

Process 400 may continue by configuring a fundamental power coupler such as the fundamental power coupler 110 to emit radio frequency electromagnetic energy into the first electromagnetic resonant cavity 102 and the second electromagnetic resonant cavity 126 (task 406).

Process 400 may continue by providing the free electron laser 206 operable to receive the particle beam 112 (task 408).

Process 400 may continue by providing a wiggler/undulator such as the wiggler/undulator 208 operable to receive the particle beam 112 (task 410).

Process 400 may continue by providing at least one coaxial transmission line such as the first coaxial transmission line 106 operable to deliver the radio frequency electromagnetic energy to the fundamental power coupler 110 (task 412).

Process 400 may continue by spacing the first electromagnetic resonant cavity and the second electromagnetic resonant cavity substantially at an interval of $\lambda/2$ such as the interval 130 (task 414). As explained above, $\lambda$ is equal to an axial velocity of the particle beam divided by a frequency of the radio frequency electromagnetic energy.

In this manner, embodiments of the disclosure provide a high brightness electron beam that can provide an average current on the order of 1 ampere. Embodiments of the disclosure provide for future high power free electron lasers and other accelerator-driven sources of electromagnetic radiation.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the controller 210 to cause the controller 210 to perform specified operations. Such instructions, generally referred to as "computer program code" or "program code" (which may be grouped in the form of computer programs or other groupings), when executed, enable power utilization scheduling methods of the system 200.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-4 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A radio frequency particle accelerator structure, comprising:
   a first electromagnetic resonant cavity operable to drive a particle beam by resonating an electromagnetic mode, wherein the first electromagnetic resonant cavity has a first end and a second end;
   a second electromagnetic resonant cavity sequentially coupled to the first electromagnetic resonant cavity, and operable to drive the particle beam by resonating the electromagnetic mode, wherein the second electromagnetic resonant cavity has a first end and a second end;
   a beam pipe directly connecting the second end of the first electromagnetic resonant cavity and the first end of the second electromagnetic cavity;
   a first fundamental power coupler directly coupled to the first end of the first electromagnetic resonant cavity and operable to emit radio frequency electromagnetic energy into the first end of the first electromagnetic resonant cavity; and
   a second fundamental power coupler located in the beam pipe and operable to emit radio frequency electromagnetic energy into the second end of the first electromagnetic resonant cavity and the first end of the second electromagnetic resonant cavity.

2. The radio frequency particle accelerator structure of claim 1, wherein the radio frequency particle accelerator structure comprises a linear accelerator.

3. The radio frequency particle accelerator structure of claim 1, further comprising a free electron laser operable to receive the particle beam.

4. The radio frequency particle accelerator structure of claim 1, further comprising a wiggler/undulator operable to receive the particle beam.

5. The radio frequency particle accelerator structure of claim 1, further comprising at least one coaxial transmission line operable to deliver the radio frequency electromagnetic energy to the second fundamental power coupler.

6. The radio frequency particle accelerator structure of claim 5, wherein the at least one coaxial transmission line is further operable to provide structural support to the second fundamental power coupler.

7. The radio frequency particle accelerator structure of claim 1, wherein the beam pipe has a particular beam pipe length such that a center of the first electromagnetic resonant cavity and a center of the second electromagnetic resonant cavity are separated by a distance of one half of a free space wavelength of the electromagnetic mode.

8. A particle acceleration method, the method comprising:
   emitting radio frequency electromagnetic energy from a first fundamental power coupler directly coupled to a first end of a first electromagnetic resonant cavity;
   emitting radio frequency electromagnetic energy from a second fundamental power coupler located in a beam pipe directly connecting a second end of the first electromagnetic resonant cavity to a first end of a second electromagnetic resonant cavity; and
   resonating the radio frequency electromagnetic energy in the first electromagnetic resonant cavity and the second electromagnetic resonant cavity.

9. The method of claim 8, further comprising delivering the radio frequency electromagnetic energy to the second fundamental power coupler via at least one coaxial transmission line.

10. The method of claim 8, further comprising:
    resonating an electromagnetic mode in the first electromagnetic resonant cavity and the second electromagnetic resonant cavity; and
    amplifying an energy of the electromagnetic mode via the radio frequency electromagnetic energy.

11. The method of claim 10, further comprising driving a particle beam via the electromagnetic mode.

12. The method of claim 11, further comprising receiving the particle beam at a free electron laser.

13. The method of claim 11, further comprising generating a laser beam using the particle beam.

14. The method of claim 11, wherein the beam pipe has a particular beam pipe length such that a center of the first electromagnetic resonant cavity and a center of the second electromagnetic resonant cavity are separated by a distance of one half of a free space wavelength of the electromagnetic mode.

15. A method for providing a radio frequency particle accelerator structure, the method comprising:
    providing a first electromagnetic resonant cavity operable to drive a particle beam by resonating an electromagnetic mode, wherein the first electromagnetic resonant cavity has a first end and a second end;
    providing a second electromagnetic resonant cavity sequentially coupled to the first electromagnetic resonant cavity, and operable to drive the particle beam by resonating the electromagnetic mode, wherein the second electromagnetic cavity has a first end and a second end;
    providing a beam pipe directly connecting the second end of the first electromagnetic resonant cavity to the first end of the second electromagnetic resonant cavity;

configuring a first fundamental power coupler directly coupled to the first end of the first electromagnetic resonant cavity to emit radio frequency electromagnetic energy into the first end of the first electromagnetic resonant cavity; and configuring a second fundamental power coupler located within the beam pipe to emit radio frequency electromagnetic energy into the second end of the first electromagnetic resonant cavity and the first end of the second electromagnetic resonant cavity.

16. The method of claim 15, further comprising providing a free electron laser operable to receive the particle beam.

17. The method of claim 15, further comprising providing a wiggler/undulator operable to receive the particle beam.

18. The method of claim 15, further comprising providing at least one coaxial transmission line operable to deliver the radio frequency electromagnetic energy to the second fundamental power coupler.

19. The method of claim 18, wherein the at least one coaxial transmission line is further operable to provide structural support to the second fundamental power coupler.

20. The method of claim 15, wherein the beam pipe has a particular beam pipe length such that a center of the first electromagnetic resonant cavity and a center of the second electromagnetic resonant cavity are separated by a distance of one half of a free space wavelength of the electromagnetic mode.

* * * * *